United States Patent
Dobson, Jr. et al.

(10) Patent No.: US 6,800,593 B2
(45) Date of Patent: Oct. 5, 2004

(54) HYDROPHILIC POLYMER CONCENTRATES

(75) Inventors: James W. Dobson, Jr., Houston, TX (US); Shauna Leigh Hayden, Houston, TX (US); Carolina Trejo Rangel, Cypress, TX (US)

(73) Assignee: Texas United Chemical Company, LLC., Houston, TX (US)

( * ) Notice: Subject to any disclaimer, the term of this patent is extended or adjusted under 35 U.S.C. 154(b) by 317 days.

(21) Appl. No.: 10/175,589

(22) Filed: Jun. 19, 2002

(65) Prior Publication Data
US 2003/0236173 A1 Dec. 25, 2003

(51) Int. Cl.$^7$ .............................. C09K 7/06; C08L 5/00
(52) U.S. Cl. .................. 507/110; 507/111; 507/112; 507/114; 507/115; 507/103; 507/134; 507/135; 507/136; 507/138; 507/139; 507/145; 507/203; 507/209; 507/211; 507/212; 507/213; 507/214; 507/215; 507/216; 507/217; 507/252; 507/255; 507/259; 507/261; 507/265; 507/266; 507/267; 507/273; 507/277; 507/131; 507/244; 524/27; 524/28; 524/31; 524/35; 524/36; 524/42; 524/43; 524/44; 524/45; 524/47; 524/49; 524/50; 524/51; 524/55
(58) Field of Search ................ 507/110–112, 114–115, 507/103, 145, 134–136, 138, 139, 203, 209, 211–217, 252, 225, 259, 261, 265–267, 273, 277, 131, 244; 524/27, 28, 31, 35, 36, 42–45, 47, 49–51, 55

(56) References Cited

U.S. PATENT DOCUMENTS

| | | | | |
|---|---|---|---|---|
| 4,312,675 A | * | 1/1982 | Pickens et al. .......... | 106/162.8 |
| 4,325,861 A | * | 4/1982 | Braun et al. ................. | 523/205 |
| 4,435,217 A | * | 3/1984 | House ..................... | 106/181.1 |
| 4,499,214 A | * | 2/1985 | Sortwell ..................... | 523/336 |
| 4,670,550 A | * | 6/1987 | Bleeker et al. ............. | 536/114 |
| 4,726,912 A | * | 2/1988 | Bishop et al. ................. | 516/22 |
| 4,772,646 A | * | 9/1988 | Harms et al. ................. | 524/27 |
| 4,964,999 A | * | 10/1990 | Russo ........................ | 507/211 |
| 5,091,448 A | * | 2/1992 | Hostettler et al. ............ | 524/45 |
| 5,278,203 A | * | 1/1994 | Harms ........................ | 523/200 |
| 5,631,313 A | * | 5/1997 | Bishop et al. ................. | 524/45 |
| 5,834,533 A | * | 11/1998 | Patel et al. .................. | 523/130 |
| 5,925,182 A | * | 7/1999 | Patel et al. .................. | 106/266 |
| 6,060,434 A | * | 5/2000 | Sweatman et al. .......... | 507/216 |
| 6,148,917 A | * | 11/2000 | Brookey et al. ............ | 166/301 |
| 6,165,947 A | * | 12/2000 | Chang et al. ................ | 507/216 |
| 6,342,467 B1 | * | 1/2002 | Chang et al. ................ | 507/110 |
| 6,620,769 B1 | * | 9/2003 | Juppe et al. ................. | 507/103 |
| 6,743,756 B2 | * | 6/2004 | Harris, Jr. ................... | 507/261 |
| 2002/0019318 A1 | * | 2/2002 | Harris ......................... | 507/200 |
| 2003/0045434 A1 | * | 3/2003 | Brothers et al. ............. | 507/219 |
| 2003/0144154 A1 | * | 7/2003 | Dobson et al. .............. | 507/200 |

* cited by examiner

Primary Examiner—Philip C. Tucker
(74) Attorney, Agent, or Firm—Roy F. House

(57) ABSTRACT

Disclosed is a hydrophilic, water soluble polymer concentrate for addition to aqueous liquids to enhance the properties thereof, particularly to increase the viscosity or decrease the fluid loss of well drilling and servicing fluids, the concentrate comprising a hydrophobic, water insoluble liquid, an organophilic clay suspension agent, the water soluble polymer, and a stabilizing agent comprising one or more acids in an amount from about 0.001% to about 1.5%, one or more anionic surfactants in an amount from about 0.001% to about 1.0%, one or more nonionic surfactants in an amount from 0.001% to about 0.625% and, from about 0% to about 0.75% of one or more water soluble organic liquids, wherein the total concentration of the stabilizing agent is from about 0.1% to about 2.5%, these percentages being based on the weight of the concentrate. Preferably the stabilizing agent is a microemulsion comprising the acid(s), the anionic surfactant(s), the nonionic surfactant(s), and the water soluble organic liquid(s), and further comprising from about 0.0005% to about 1.0% of one or more water insoluble solvents, and from about 0.001% to about 2.0% water.

15 Claims, No Drawings

HYDROPHILIC POLYMER CONCENTRATES

FIELD OF THE INVENTION

The present invention relates to non-aqueous concentrates of water soluble polymers to produce polymer-viscosified aqueous solutions to wellbore operations.

BACKGROUND OF THE INVENTION

Polymer-viscosified aqueous solutions are used for many purposes in the field of drilling, completing and servicing oil and gas wells. Exemplary gravel packing compositions and operations are set forth in the following U.S. Pat. Nos. 5,027,899; 5,058,677; 5,184,679; and 5,251,699. Exemplary acidizing compositions and operations are set forth in the following U.S. Pat. Nos. 3,779,914; 4,487,265; and 5,007,481. Exemplary well drilling and completion fluids are set forth in the following U.S. Pat. Nos. 4,620,596; 4,621,692; and 4,822,500.

Polymer-viscosified fluids require that the water soluble polymers be completely dispersed and hydrated in the aqueous fluids. One method of achieving this is to prepare a concentrate of the water soluble polymer in a liquid which has no appreciable swelling or solvating effect on the polymer. See for example the following U.S. Pat. Nos. 4,312,675; 4,325,861; 4,435,217; 4,726,912; 4,772,646; 5,091,448; 5,278,203; 5,631,313; 5,834,533; and 5,925,182. Concentrates of water soluble polymers in water-in-oil emulsions are disclosed in U.S. Pat. Nos. 4,670,550 and 4,964,999.

We have now developed a water soluble polymer-containing concentrate which has superior stability exhibiting no polymer settling and little to no liquid syneresis on aging at 120° F. for 16 hours.

SUMMARY OF THE INVENTION

A hydrophilic polymer concentrate composition comprising: a) from about 45% to about 70% of one or more hydrophilic, water soluble polymers; b) from about 0.5% to about 1.5% of an organophilic clay (organoclay) suspension additive; c) from about 0.1% to about 2.5% of a stabilizing agent comprising one or more acids in an amount from about 0.001% to about 1.5%, one or more anionic surfactants in an amount from about 0.001% to about 1.0%, one or more nonionic surfactants in an amount from about 0.001% to about 0.625%, and from about 0% to about 0.75% of one or more water soluble organic liquids; and d) from about 25% to about 55% of a hydrophobic, water insoluble liquid suspension medium.

Unless otherwise indicated herein, the above percentages and percentages indicated hereinafter are weight percentages based on the total concentrate composition weight.

Preferably the stabilizing agent is a microemulsion comprising from about 1% to about 80% water, from about 1% to about 60% of one or more acids, from about 1% to about 40% of one or more anionic surfactants, from about 1% to about 25% of one or more nonionic surfactants, from about 0.5% to about 40% of one or more solvents, and from 0% to about 30% of a water soluble organic liquid, wherein these percentages are weight percent based on the weight of the stabilizing agent and total 100%.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DETAILED DESCRIPTION OF THE INVENTION AND THE PREFERRED EMBODIMENTS THEREOF

The water soluble or water dispersible polymer used in accordance with the present invention is a hydrophilic colloid, preferably a polysaccharide or polysaccharide derivative as is well known in the art.

Such polysaccharides are commonly obtained from various plants. These natural gums may be exudates or extractives from various plants. Natural-based synthetic polysaccharide polymers are processed or derivatized from various plant sources of cellulose, starch and the like. Biopolymers are biologically produced by the action of certain fungi, bacteria or other microorganisms (specifically, their enzymes) on suitable substrates. These biologically produced polymers result from the almost total decomposition of the substrate into its monosaccharides followed by re-synthesis into new molecules utilizing some or all of these changes: points of attachment other than $C_4$, partial oxidation of the hydroxyl groups, interchain crosslinking, or introduction of new chemical groups to replace the hydroxyl hydrogen.

Exemplary natural gums are alginates, carrageen, guar gum, gum agar, gum arabic, gum ghatti, gum karaya, gum tragacanth, locust bean gum, and tamarind gum.

Natural-based synthetic polysaccharides result from the derivatization of cellulose, starch or other polysaccharides by carboxymethylation, hydroxyethylation, hydroxypropylation, carboxylation, the addition of sulfonic acid groups crosslinking, or mixtures of these processes, and others.

Exemplary natural-based synthetic polysaccharides include polyanionic cellulose, carboxymethyl cellulose, hydroxyethyl cellulose, carboxymethyl hydroxyethyl cellulose, hydroxypropyl guar, carboxymethyl hydroxypropyl guar, carboxymethyl guar, and the like.

Exemplary biopolymers include xanthan gum, wellan gum, rhamsan gum, gellan gum, scleroglucan gum, succinoglycan gum, and the like.

These polysaccharide polymers are commercially available from various sources.

Preferred water soluble polymers are xanthan gum, hydroxyethyl cellulose, carboxymethyl cellulose, carboxymethyl hydroxyethyl cellulose, and hydroxypropyl guar.

The organophilic clay is a well known, commercially available viscosifier/suspension additive for organic liquids. Suitable organophilic clays are the reaction products of smectite-type clays and organic cations, i.e., quaternary ammonium cations. See for example Dino U.S. Pat. No. 6,187,719, incorporated herein by reference. The preferred smectite-type clay is selected from the group consisting of bentonite, hectorite, montmorillonite, biedellite, saponite, stevensite, and mixtures thereof, most preferably bentonite. The preferred quaternary ammonium cations are selected from the group consisting of methyl trihydrogenatedtallow ammonium, dimethyl dihydrogenatedtallow ammonium, dimethyl benzyl hydrogenatedtallow ammonium, methyl benzyl dihydrogenatedtallow ammonium, and mixtures thereof.

Exemplary commercially available organophilic clays include: BARAGEL 3000, BENTONE 38, BENTONE 155, BENTONE 34, BENTONE 128, BENTONE 990 and the like obtained from Rheox, Inc., P. O. Box 700, Hightstown, N.J. 08520, U.S.A.; TX-1178, TIXOGEL VP, THIXOGEL MP-100, TIXOGEL TE, and the like obtained from Sud-Chemie Rheologicals, United Catalysts, Inc., P. O. Box 32370, Louisville, Ky. 40232, U.S.A.; and CLAYTONE 40, CLAYTONE AF, and the like obtained from Southern Clay Products, P. O. Box 44, 1212 Church Street, Gonzales, Tex. 78629, U.S.A.

The organophilic clay should be thoroughly dispersed throughout the hydrophobic, non-water soluble liquid suspension medium. This may require the use of polar activators, dispersants, dispersion acids, and the like, as is well known in the art. See for example Mattingly U.S. Pat. No. 5,186,747, incorporated herein by reference. The polar additive, if required or desired, may be added separately to the hydrophobic liquid or mixed with the organophilic clay to produce a "self-activating" organoclay.

The hydrophobic, non-water soluble organic liquid useful as the suspension medium or carrier in the concentrates of this invention may be any such liquid in which the chosen organophilic clay functions to efficiently increase the viscosity thereof. Preferably the non-water soluble organic liquid is a hydrocarbon such as alkenes (paraffins, isoparaffins) having the molecular formula $CnH2n+2$, alkenes (olefins, alpha olefins, polyalphaolefins) having the molecular formula $CnH2n$, various petroleum fractions such as mineral oils, diesel oil, white oils, and the like. Basically the oleaginous liquid can be any hydrophobic, non-water soluble liquid which has no swelling or solvating effect on the water soluble, hydrophilic polymer suspended therein. Other water insoluble organic liquids which may be useful in this invention are terpenes, vegetable oils, carboxylic esters, malonic esters, sulfonic esters, limonene, alcohols containing 6 to 10 carbon atoms, and the like.

The stabilizing agent useful in the concentrates of this invention is a mixture of (i) one or more acids, (ii) one or more anionic surfactants, (iii) one or more nonionic surfactants, and preferably, (iv) one or more water insoluble organic liquids.

Most preferably the stabilizing agent of this invention is a microemulsion comprising (i) one or more acids, (ii) one or more anionic surfactants, (iii) one or more nonionic surfactants, (iv) optionally, one or more water soluble organic liquids, (v) one or more solvents, and (vi) water.

The concentration of the stabilizing agent in the concentrates of the invention is from about 0.1% to about 2.5% by weight, preferably from about 0.15% to about 2.0%. Thus the concentrations of the acid(s), anionic surfactant(s), nonionic surfactant(s), and water soluble organic liquid(s) in the concentrate is as follows:

TABLE A

| Stabilizing Agent Component | % by Weight of the Concentrate | | |
|---|---|---|---|
| | Operable | Preferred | Most Preferred |
| Acid(s) | 0.001–1.5 | 0.0075–0.75 | 0.0075–0.4 |
| Anionic Surfactant(s) | 0.001–1.0 | 0.012–0.75 | 0.0135–0.4 |
| Nonionic Surfactant(s) | 0.001–0.625 | 0.0015–0.5 | 0.003–0.2 |
| Water Soluble Organic Liquid(s) | 0–0.75 | 0.0015–0.625 | 0.0075–0.375 |

As indicated, the preferred stabilizing agent is a microemulsion comprising one or more acids, one or more anionic surfactants, one or more nonionic surfactants, one or more solvents, water, and, optionally, one or more water soluble organic liquids.

The concentration of the components in the microemulsion are as follows:

TABLE B

| Microemulsion Component | % by Weight of the Microemulsion | | |
|---|---|---|---|
| | Operable | Preferred | Most Preferred |
| Acid(s) | 1–60 | 5–30 | 5–16 |
| Anionic Surfactant(s) | 1–40 | 8–30 | 9–20 |
| Nonionic Surfactant(s) | 1–25 | 1–20 | 2–10 |
| Solvent(s) | 0.5–40 | 2–15 | 2–10 |
| Water Soluble Organic Liquid(s) | 0–30 | 1–25 | 5–15 |
| Water | 1–80 | 20–75 | 30–70 |

Thus the concentration of the components of the microemulsion in the concentrates of the invention are as follows:

TABLE C

| Microemulsion Component | % by Weight of the Concentrate | | |
|---|---|---|---|
| | Operable | Preferred | Most Preferred |
| Acid(s) | 0.001–1.5 | 0.0075–0.75 | 0.0075–0.4 |
| Anionic Surfactant(s) | 0.001–1.0 | 0.012–0.75 | 0.0135–0.4 |
| Nonionic Surfactant(s) | 0.001–0.625 | 0.0015–0.5 | 0.003–0.2 |
| Solvent(s) | 0.0005–1.0 | 0.003–0.375 | 0.003–0.25 |
| Water Soluble Organic Liquid(s) | 0–0.75 | 0.0015–0.625 | 0.0075–0.375 |
| Water | 0.001–2.0 | 0.03–1.875 | 0.045–1.75 |

Suitable acids for use in preparing the stabilizing agent and hence the concentrates of the invention comprise inorganic acids such as hydrochloric, phosphoric, sulfuric, hydrofluoric, ammonium bifluoride, and nitric, and organic acids containing less than about 7 carbon atoms, including carboxylic acids, polycarboxylic acids, and anhydrides thereof, and sulfonic acids, such as citric, oxalic, maleic, acetic, fumaric, malic, glutaric, or glutamic acids, as well as blends of all of such acids. Preferably the acids are selected from the group consisting of inorganic acids, organic acids containing less than seven carbon atoms, and mixtures thereof Anionic surfactants suitable for use in forming the concentrates and microemulsion stabilizing agents in accordance with the present invention are the alkali metal, alkaline earth metal, ammonium, or amine salts of various organic acids which function to lower the surface tension of water. The preferred anionic surfactants include fatty acid soaps, alkyl sulfonates, alpha olefin sulfonates, alkyl ether sulfates and sulfonates, linear alkyl benzene sulfonates, aromatic sulfonates such as cumene, xylene and toluene sulfonates, olefin sulfonates, alcohol sulfates and sulfonates, and mixtures thereof.

Nonionic surfactants suitable for use in forming the concentrations and microemulsions in accordance with the present invention comprise ethoxylated nonionic surfactants selected from the group consisting of condensation products of ethylene oxide with aliphatic alcohols having from 8 to 22 carbon atoms in either straight or branched chain configuration as well as ethoxylated nonionic surfactants selected from the group consisting of condensation products of ethylene oxide with nonyl phenol, phenol, butyl phenol, dinonyl phenol, octyl phenol or other phenols, glycerides, polypropylene glycols, and the like, as well as blends of such nonionic surfactants.

Water soluble organic liquids suitable for use in forming the concentrates and microemulsions of the present invention comprise n-butanol, iso-butanol, n-butoxy propanol, esthers, monobutyl ether, glycols including propylene glycol, ethylene glycol, butylene glycol, hexylene glycol, dipropylene glycol, di-ethylene glycol, tripropylene glycol, triethylene glycol, poly glycols, and mixtures of such water soluble organic liquids. Microemulsions which comprise two or more water soluble organic liquids appear to possess improved stability.

Solvents suitable for use in forming the microemulsions and hence the concentrates in accordance with the present invention comprise limonene, di-limonene, terpenes, terpinol, pinenes, pentenes, paracymene, di-butyl ether, butyl butyrate, amyl acetate, acetates, oleates, heptanoates, laurates, caprylates, adipates, butyrates, iso-butyrates, esters, diethers, olefins, alpha olefins, xylene, toluene, isoparaffins, 2-ethyl hexanol, hexanol, and the like, and mixtures thereof.

Additional ingredients which do not detract from the efficacy of the concentrates and the microemulsions also may be included in the mixture. For example, cationic surfactants may be used in addition to the anionic and nonionic surfactants. A list of possible cationic surfactants comprise certain quaternaries, halogenated amines, complex amides and amido-amines. Oxidizing agents such as permanganates and peroxides may be included in the compositions. Additionally, the compositions may have corrosion inhibitors included therein.

In order that the invention may be further understood, it will be described hereafter with reference to embodiments of the invention and non-limiting examples.

Two hydrophobic, water insoluble liquids were used: VASSA-LP 90, a product of Vassa, Torre Pequiven, Piso-1, Av. Francisco de Miranda, Chacao, Caracas, Venezuela; and a white mineral oil (WMO), PAROL, CASRN 8042-47-5, manufactured by Penreco, 138 Petrolia Street, Karns City, Pa. 16041-9799, USA.

VASSA LP-90 is a hydrogenated oil whose composition is saturated hydrocarbons (paraffins) of medium and high molecular weight.

The organophilic clay utilized was CLAYTONE AF from Southern Clay Products of Gonzales, Tex. It is a quaternary ammonium modified montmorillonite and is self-dispersing.

The commercial microemulsion stabilizing agent evaluated is CC-100, a product of Gaston Technology Development Services, P. O. Box 22032, Houston, Tex. 77227-2032.

Three stabilizing agent mixtures are prepared. Their composition is set forth in Table A. The anionic surfactants are: ME-29, a mixture of the amine salts of a linear alkyl benzene sulfonic acid and an alcohol sulfate sold under the tradename ME-29 Terpene emulsifier by Expo Chemical Company, Inc. of Houston, Tex.; and ME-91, a mixture of the amine salts of a linear alkyl benezene sulfonic acid and an alcohol sulfate sold under the tradename ME-91 Terpene emulsifier by Expo Chemical Company, Inc. of Houston, Tex. The nonionic surfactants are: NP-10 and NP-101, nonyl phenol ethoxylates available from numerous distributors worldwide; and MEGASURF S-100, a mixture of the condensation products of ethylene oxide with aliphatic alcohol distributed by Shrieve Chemicals, Inc. for Shell Chemical Company, Inc.,Houston, Tex. The water soluble organic liquids are: Diethyleneglycol monobutyl ether (DGMBE) and dipropylene glycol (DPG), both available from numerous distributors worldwide.

These stabilizing agents are prepared by mixing together the components with low shear to prevent the generation of a stable foam.

TABLE A

| Stabilizing Agent | SA-1 | | SA-2 | | SA-3 | |
|---|---|---|---|---|---|---|
| Components | PBW* | % | PBW* | % | PBW* | % |
| Acid Blend | | | | | | |
| HCl (32%) | 3.5 | 12.77 | 2.6 | 6.42 | 2.6 | 6.13 |
| (85%) Phosphoric | 2.0 | 7.30 | 1.5 | 3.70 | 1.5 | 3.54 |
| Citric Acid | 1.2 | 4.38 | 0.9 | 2.22 | 0.9 | 2.12 |
| Oxalic Acid | 0.7 | 2.55 | 0.5 | 1.23 | 0.4 | 0.94 |
| Sulfuric Acid | 0 | 0 | 5.0 | 12.35 | 5.0 | 11.79 |
| Anionic Surfactant | | | | | | |
| ME-29 | 10.0 | 36.50 | 12.0 | 29.63 | 0 | 0 |
| ME-91 | 0 | 0 | 0 | 0 | 14.0 | 33.02 |
| Nonionic Surfactant | | | | | | |
| NP-10 | 2.0 | 7.30 | 5.0 | 12.55 | 0 | 0 |
| NP-101 | 0 | 0 | 0 | 0 | 5.0 | 11.79 |
| MEGA SURF S-100 | 0 | 0 | 3.0 | 7.41 | 3.0 | 7.08 |
| Water Soluble Organic Liquid | | | | | | |
| DGMBE | 3.0 | 10.95 | 7.0 | 17.28 | 7.0 | 16.51 |
| DPG | 5.0 | 18.25 | 3.0 | 7.41 | 3.0 | 7.08 |

*PBW parts by weight

Concentrates containing the water soluble polymer hydroxyethyl cellulose (HEC-25, a product of the Union Carbide Corp., 39 Old Ridgebury Rd., Danbury, Conn. 06817) in the white mineral oil (WMO) are prepared by dispersing the CLAYTONE AF organophilic clay in the WMO, adding the Stabilizing Agent and mixing until homogeneous. The composition of the concentrates is set forth in Table I. All of these concentrates are stable on static aging for 16 hours at 120° F. (48.9° C.) exhibiting no syneresis of oil therefrom.

Concentrates containing the water soluble polymer xanthan gum (RHODOPOL 23P, manufactured by Rhodia, Inc., CN 7500, Prospect Plains Road, Cranbury, N.J. 08512-7500) were prepared having the compositions set forth in Table II. The CLAYTONE AF Organophilic clay was dispersed in the hydrophobic, water insoluble liquid, the CC-100 stabilizing agent was added and mixed until homogeneous, and the xanthan gum was then added and mixed until homogeneous. The low shear rate viscosity was obtained on the concentrates. The concentrates were then static aged at 120° F. (48.9° C.) for 16 hours, cooled to room temperature, and observed for settling of the xanthan gum and syneresis of the liquid. The hydration characteristics of the concentrates was evaluated by dispersing 1.65 grams of each concentrate in 350 milliliters of a 10.0 pound per gallon sodium chloride brine (thus the concentration of the xanthan gum was one pound per 42 gallon barrel of the brine) and measuring the low shear rate viscosity after 2, 4, and 6 minutes mixing. The low shear rate viscosity (LSRV) is measured with a Brookfield Model LVDV II viscometer at 0.3 rpm (0.063 sec$^{-1}$) #2 LV Spindle. The data obtained is set forth in Table II.

A concentrate having the composition I-1 was prepared by dispersing the CLAYTONE AF in the white mineral oil, then adding and mixing the CC-100 stabilizing agent, followed by adding and mixing the hydroxyethyl cellulose until homogeneous. This concentrate had a low shear rate viscosity at 82° F. (27.8° C.) of 51,299 cp. Another concentrate was prepared having the composition of I-1 except that the stabilizing agent was added to the white mineral oil before the CLAYTONE AF. This concentrate had a low shear rate viscosity of 33,400 cp. An additional 23.10 pbw of hydroxyethyl cellulose was added to this concentrate. The concentrate had a LSRV of 55,388 cp. Thus the addition of the stabilizing agent to the water insoluble oil before dispersing the Organophilic clay results in a decreased viscosity enabling more water soluble polymer to be incorporated into the concentrate.

TABLE I

Concentrates Containing Hydroxyethyl Cellulose HEC) in a White Mineral Oil (WMO)

| | Concentrate | | | | |
|---|---|---|---|---|---|
| | I-1 | I-2 | I-3 | I-4 | I-5 |
| WMO, pbw | 176.9 | 161.7 | 176.9 | 176.9 | 171.7 |
| CLAYTONE AF, pbw | 4.0 | 4.0 | 4.0 | 5.0 | 5.0 |
| Stabilizing Agent | | | | | |
| CC-100, pbw | 1.5 | 1.0 | — | — | — |
| SA-1, pbw | — | — | 0.75 | — | — |
| SA-2, pbw | — | — | — | 0.4 | — |
| SA-3, pbw | — | — | — | — | 4.0 |
| HEC, pbw | 175 | 200 | 200 | 175 | 175 |

TABLE II

Concentrates Containing Xanthan Gum (XG) in White Mineral Oil (WMO) or VASSA LP-90 Oil (LP-90)

| | Concentrate | | | |
|---|---|---|---|---|
| | II-1 | II-2 | II-3 | II-4 |
| WMO, g | 149.85 | 147.4 | 149.2 | — |
| LP-90, g | — | — | — | 147.5 |
| CLAYTONE AF, g | 5.0 | 5.74 | 5.25 | 5.0 |
| CC-100, g | 6.0 | 7.05 | 6.32 | 1.0 |
| XG, g | 240.0 | 240.0 | 240 | 250 |
| LSRV @ 76° F. | 81,483 | 85,582 | 75,584 | 33,393 |
| After Static Aging at 160° F. for 16 Hours | | | | |
| Settling | None | V.Sl.* | V.Sl.* | V.Sl.* |
| Syneresis | 1/32" | None | None | None |
| Hydration Characteristics of Aged Concentrates in a 10.0 ppg NaCl Brine | | | | |
| Concentrate,g | 1.65 | 1.65 | 1.65 | 1.61 |
| LSRV @ 2 minutes, cp | 9698 | 7398 | 7798 | 9799 |
| LSRV @ 4 minutes, cp | 9698 | 7698 | 7998 | 10799 |
| LSRV @ 6 minutes, cp | 9698 | 7698 | 7698 | 10699 |

*V.Sl.—very slight

What is claimed is:

1. A hydrophilic polymer concentrate comprising from about 45% to about 70% of one or more hydrophilic polymers, a stabilizing agent comprising one or more acids in an amount from about 0.001% to about 1.5%, one or more anionic surfactants in an amount from about 0.001% to about 1.0%, one or more nonionic surfactants in an amount from about 0.001% to about 0.625, and one or more water soluble organic liquids in an amount from about 0% to about 0.75%, wherein the total concentration of the stabilizing agent is from about 0.1% to about 2.5%, and from about 0.5% to about 1.5% of an organophilic clay, and the balance to make 100% of a hydrophobic, water insoluble liquid.

2. The hydrophilic polymer concentrate of claim 1 wherein the stabilizing agent is a microemulsion comprising the acid, the anionic surfactant, the nonionic surfactant, and the water soluble organic liquid, and further comprising from about 0.0005% to about 1.0% of one or more water insoluble solvents, and from about 0.001% to about 2.0% water, wherein the total concentration of the stabilization agent is from about 0.1% to about 2.5%.

3. The hydrophilic polymer concentrate of claim 1 wherein the stabilizing agent comprises one or more acids in an amount from about 0.0075% to about 0.75%, one or more anionic surfactants in an amount from about 0.012% to about 0.75%, one or more nonionic surfactants in an amount from about 0.0015% to about 0.5%, and one or more water soluble liquids in an amount from about 0.0015% to about 0.625%.

4. The hydrophilic polymer concentrate of claim 3 wherein the stabilizing agent is a microemulsion comprising the acid, the anionic surfactant, the nonionic surfactant, and the water soluble organic liquid, and further comprising from about 0.003% to about 0.375% of one or more water insoluble solvents, and from about 0.03% to about 1.875% water, wherein the total concentration of the stabilization agent is from about 0.15% to about 2.0%.

5. The hydrophilic polymer concentrate of claim 1 wherein the stabilizing agent comprises one or more acids in an amount from about 0.0075% to about 0.4%, one or more anionic surfactants in an amount from about 0.0135% to about 0.4%, one or more nonionic surfactants in an amount from about 0.003% to about 0.2%, and one or more water soluble liquids in an amount from about 0.0075% to about 0.375%.

6. The hydrophilic polymer concentrate of claim 5 wherein the stabilizing agent is a microemulsion comprising the acid, the anionic surfactant, the nonionic surfactant, and the water soluble organic liquid, and further comprising from about 0.003% to about 0.25% of one or more water insoluble solvents, and from about 0.045% to about 1.75% water, wherein the total concentration of the stabilization agent is from about 0.15% to about 2.0%.

7. The hydrophilic polymer concentrate of claim 1, 2, 3, 4, 5, or 6 wherein the hydrophilic polymer is xanthan gum.

8. The hydrophilic polymer concentrate of claim 1, 2, 3, 4, 5, or 6 wherein the hydrophilic polymer is hydroxyethyl cellulose.

9. The hydrophilic polymer concentrate of claim 1, 3, or 5 wherein the hydrophilic polymer is xanthan gum, wherein the concentration of the xanthan gum is from about 55% to about 70%, wherein the acid is selected from the group consisting of hydrochloric acid, phosphoric acid, sulfuric acid, hydrofluoric acid, ammonium bifluoride, nitric acid, citric acid, oxalic acid, maleic acid, acetic acid, fumaric acid, malic acid, glutaric acid, glutamic acid, and mixtures thereof, wherein the nonionic surfactant is selected from the group consisting of (1) condensation products of ethylene oxide with aliphatic alcohols having from 8 to about 22 carbon atoms in either straight chain or branched chain configuration, (2) condensation products of ethylene oxide with a phenol, and (3) mixtures thereof, wherein the anionic surfactant is an alkali metal, alkaline earth metal, ammonium, or amine salt selected from the group consisting of fatty acid soaps, alpha olefin sulfonate, sulfonates, amine ethoxylates, linear alkyl benzene sulfonates, aromatic sulfonates comprising cumene, xylene, and toluene sulfonate, alcohol sulfates, and mixtures thereof, and wherein the water soluble organic liquid is selected from the group consisting of n-butanol, iso-butanol, n-butoxy propanol, glycols containing up to about six carbon atoms, glycol ethers containing up to about nine carbon atoms, and mixtures thereof.

10. The hydrophilic polymer concentrate of claim 2 wherein the microemulsion comprises from about 1% to about 60% of one or more acids, from about 1% to about 40% of one or more anionic surfactants, from about 1% to about 25% of one or more nonionic surfactants, from about 0% to about 30% of one or more water soluble organic liquids, from about 0.5% to about 40% of one or more solvents, and from about 1% to about 80% water, the percentages based on the weight of the microemulsion and total 100%.

11. The hydrophilic polymer concentrate of claim 4 wherein the microemulsion comprises from about 5% to about 30% of one or more acids, from about 8% to about 30% of one or more anionic surfactants, from about 1% to about 20% of one or more nonanionic surfactants, from 1% to about 25% of one or more water soluble organic liquids, from about 2% to about 15% of one or more solvents, and from about 20% to about 75% water, the percentages based on the weight of the microemulsion and total 100%.

12. The hydrophilic polymer concentrate of claim 6 wherein the microemulsion comprises from about 5% to about 16% of one or more acids, from about 9% to about 20% of one or more anionic surfactants, from about 2% to about 10% of one or more nonanionic surfactants, from 5% to about 15% of one or more water soluble organic liquids, from about 2% to about 10% of one or more solvents, and from about 30% to about 70% water, the percentages based on the weight of the microemulsion and total 100%.

13. The hydrophilic polymer concentrate of claim 2, 4, 6, 10, 11, or 12 wherein the hydrophilic polymer is xanthan gum, wherein the concentration of the xanthan gum is from about 55% to about 70%, wherein the acid is selected from the group consisting of hydrochloric acid, phosphoric acid, sulfuric acid, hydrofluoric acid, ammonium bifluoride, nitric acid, citric acid, oxalic acid, maleic acid, acetic acid, fumaric acid, malic acid, glutaric acid, glutamic acid, and mixtures thereof, wherein the nonionic surfactant is selected from the group consisting of (1) condensation products of ethylene oxide with aliphatic alcohols having from 8 to about 22 carbon atoms in either straight chain or branched chain configuration, (2) condensation products of ethylene oxide with a phenol, and (3) mixtures thereof, wherein the anionic surfactant is an alkali metal, alkaline earth metal, ammonium, or amine salt selected from the group consisting of fatty acid soaps, alpha olefin sulfonate, sulfonates, amine ethoxylates, linear alkyl benzene sulfonates, aromatic sulfonates comprising cumene, xylene, and toluene sulfonate, alcohol sulfates, and mixtures thereof, and wherein the water soluble organic liquid is selected from the group consisting of n-butanol, iso-butanol, n-butoxy propanol, glycols containing up to about six carbon atoms, glycol ethers containing up to about nine carbon atoms, and mixtures thereof.

14. The hydrophilic polymer concentrate of claim 1, 3, or 5 wherein the hydrophilic polymer is xanthan gum and wherein the acid(s) is selected from the group consisting of inorganic acids, organic acids containing less than about seven carbon atoms, and mixtures thereof.

15. The hydrophilic polymer concentration of claim 2, 4, 6, 10, 11, or 12 wherein the hydrophilic polymer is xanthan gum and wherein the acid(s) is selected from the group consisting of inorganic acids, organic acids containing less than about seven carbon atoms, and mixtures thereof.

* * * * *